United States Patent
Diab (10) Patent No.: US 7,930,373 B2
(45) Date of Patent: Apr. 19, 2011

(54) SYSTEM AND METHOD FOR CONTROLLING A PHY ATTACHED TO A MAC INTERFACE FOR ENERGY EFFICIENT ETHERNET

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 283 days.

(21) Appl. No.: 12/165,564

(22) Filed: Jun. 30, 2008

(65) Prior Publication Data

US 2009/0327506 A1    Dec. 31, 2009

(51) Int. Cl.
G06F 15/177    (2006.01)
(52) U.S. Cl. ........................ 709/220; 709/221
(58) Field of Classification Search .............. 709/220, 709/221
See application file for complete search history.

(56) References Cited

U.S. PATENT DOCUMENTS

| | | | |
|---|---|---|---|
| 6,366,557 B1 * | 4/2002 | Hunter | 370/217 |
| 6,442,174 B1 * | 8/2002 | Lin | 370/466 |
| 7,417,949 B2 * | 8/2008 | Weller et al. | 370/229 |
| 2007/0049239 A1 * | 3/2007 | Joung et al. | 455/343.1 |
| 2007/0280239 A1 * | 12/2007 | Lund | 370/392 |
| 2008/0225879 A1 * | 9/2008 | Powell | 370/445 |
| 2008/0232290 A1 * | 9/2008 | Elzur et al. | 370/311 |
| 2009/0097401 A1 * | 4/2009 | Diab | 370/230 |
| 2009/0225773 A1 * | 9/2009 | Winter | 370/437 |
| 2009/0263127 A1 * | 10/2009 | Haran et al. | 398/38 |
| 2010/0118753 A1 * | 5/2010 | Mandin et al. | 370/311 |

* cited by examiner

Primary Examiner — Kenny S Lin
(74) Attorney, Agent, or Firm — Duane S. Kobayashi (57) ABSTRACT

A system and method for controlling a physical layer device attached to a media access control interface for energy efficient Ethernet. Detecting of a condition that is conducive to a change in a link rate can be performed at either link partner. In one embodiment, a control message based on the detection can be sent to a physical layer device via a media access control layer interface to effect a link rate change in the physical layer device.

21 Claims, 9 Drawing Sheets

SYSTEM AND METHOD FOR CONTROLLING A PHY ATTACHED TO A MAC INTERFACE FOR ENERGY EFFICIENT ETHERNET

BACKGROUND

1. Field of the Invention

The present invention relates generally to Ethernet systems and, more particularly, to a system and method for controlling a physical layer device attached to a media access control interface for energy efficient Ethernet.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks has arisen to address the rising costs of IT equipment usage as a whole (i.e., PCs, displays, printers, servers, network equipment, etc.).

One area that has shown the potential for cost and energy savings is efficient link utilization. Most network links are typically in an idle state between sporadic bursts of data. The overall link utilization is therefore relatively low. In one solution, the link rate can be reduced when the high data capacity is not needed, thereby saving energy. In other words, a link can use a high data rate when data transmission needs are high, and use a low data rate when data transmission needs are low. In another solution, a link can be designed to enter into a low power idle mode where the active channel is turned silent. While these solutions can provide significant energy savings, what is needed is a mechanism for controlling physical layer devices that implement efficient link utilization.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

SUMMARY

A system and/or method for controlling a physical layer device attached to a media access control interface for energy efficient Ethernet, substantially as shown in and/or described in connection with at least one of the figures, as set forth more completely in the claims.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet has become an increasingly pervasive technology that has been applied in various contexts such as twisted pair and backplane. IEEE 802.3az Energy Efficient Ethernet (EEE) continues to evaluate various methods for reducing energy used by reducing link rates during periods of low link utilization. In this process, a protocol would be defined that would facilitate transition to and from lower power consumption modes in response to changes in network demand.

One of the protocols being considered is a subset PHY technique. In this subset PHY technique, a low link utilization period can be accommodated by transitioning the PHY to a lower link rate that is enabled by a subset of the parent PHY. In one embodiment, the subset PHY technique is enabled by turning off portions of the parent PHY to enable operation at a lower or subset rate. For example, a subset 1G PHY can be created from a parent 10GBASE-T PHY by a process that turns off three of the four channels. In another embodiment, the subset PHY technique is enabled by slowing down the clock rate of a parent PHY. For example, a parent PHY having an enhanced core that can be slowed down and sped up by a frequency multiple can be slowed down by a factor of 10 during low link utilization, then sped up by a factor of 10 when a burst of data is received. In this example of a factor of 10, a 10G enhanced core can be transitioned down to a 1G link rate when idle, and sped back up to a 10G link rate when data is to be transmitted. Another of the protocols being considered is low power idle (LPI). In general, LPI relies on turning the active channel silent when there is nothing to transmit. Energy is thereby saved when the link is off. In general, both the subset and LPI techniques involve turning off portions of the PHY or otherwise modifying the PHY during periods of low link utilization.

Regardless of the method by which one or more low power consumption modes is implemented by the PHY, control of such transitions is a key factor. In one example, the control and operation of the transition between different power consumption modes is confined to the PHY itself. Here, the PHY can examine the relative amount of traffic that is transmitted to allow for a current link utilization analysis. This link utilization analysis can then be used by the PHY in deciding whether to change a power consumption mode, for example, by reducing a link rate or entering a low power idle mode.

Isolation of this transition process in the PHY has some disadvantages. For example, the PHY can only analyze current traffic transmission levels. It would not have any insight into other traffic-related factors (e.g., buffers, queues, subsystem status, etc.) in higher layers. Additionally, the isolation of the transition process in the PHY would not enable power savings to be realized in other higher layers, such as the media access control (MAC) layer.

It is therefore a feature of the present invention that control of the power consumption mode transition process can be effected at layers above the PHY. To illustrate the principles of the present invention, reference is first made to FIG. 1, which illustrates the various layers and their relation to the ISO Open System Interconnection (OSI) reference model.

Figure 1:
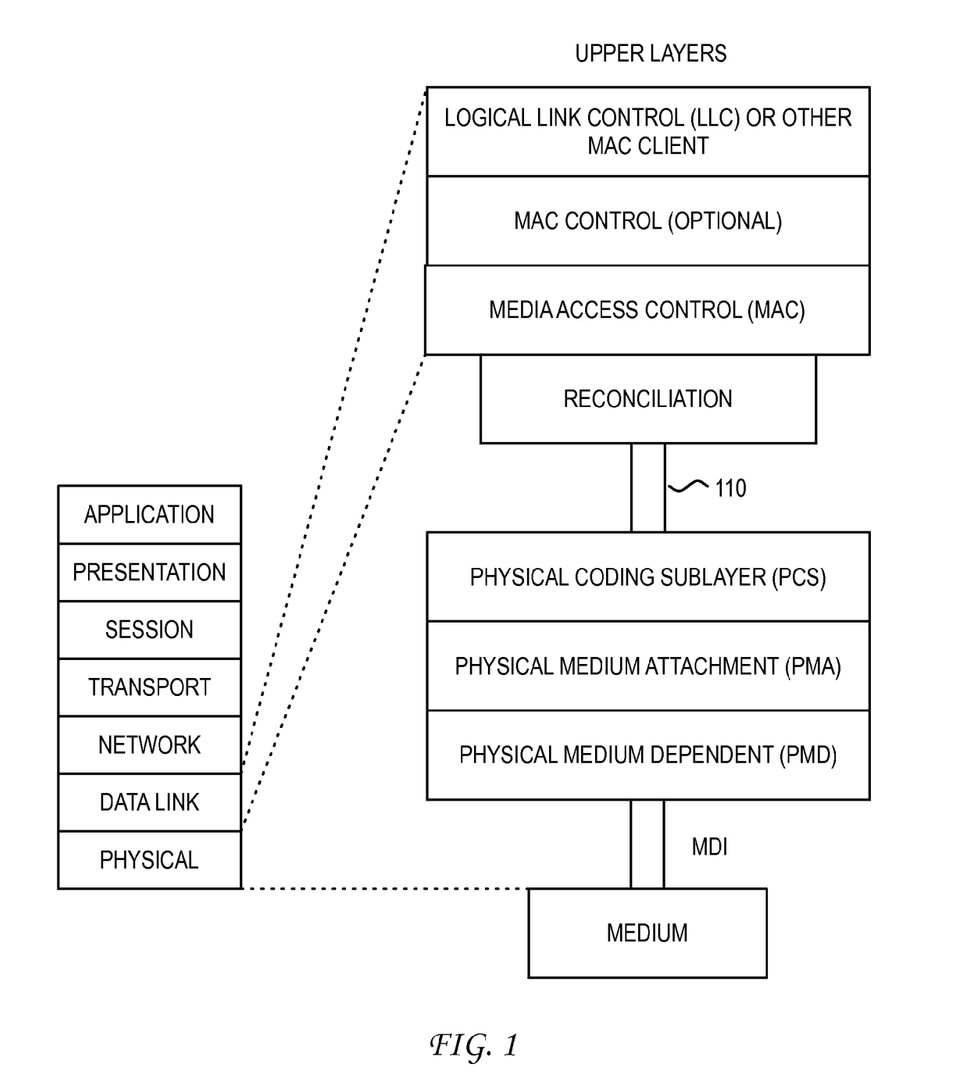
FIG. 1 illustrates various layers and their relation to the ISO Open System Interconnection (OSI) reference model.

As illustrated, the physical layer includes a physical coding sublayer (PCS), a physical medium attachment (PMA), and physical media dependent (PMD). The PCS is coupled to a reconciliation sublayer (RS), which provides a signal mapping between interface 110 and the MAC layer. In various examples, interface 110 can be based on an Attachment Unit Interface (AUI), media independent interface (MII), serial MII (SMII), reduced MII, (RMII), gigabit MII (GMII), reduced GMII (RGMII), serial GMII (SGMII), 10 gigabit MII (XGMII), 10-Gbps AUI (XAUI), or the like. In a GMII example, the PCS is generally responsible for encoding/decoding GMII octets to/from ten-bit code-groups (8B/10B) for communication with the underlying PMA. In an XGMII example, the PCS is generally responsible for encoding/decoding XGMII 64-bit data to/from 66-bit code-groups (64B/66B) for communication with the underlying PMA.

In general, the PMA abstracts the PCS from the physical medium. Accordingly, the PCS can be unaware of the type of medium. The primary functions of the PMA include mapping of transmit and receive code-groups between the PCS and PMA, serialization/de-serialization of code-groups for transmission/reception on the underlying PMD, recovery of clock from the coded data (e.g., 8B/10B, 64B/66B, etc.) supplied by the PMD, and mapping of transmit and receive bits between the PMA and PMD.

The PMD is generally responsible for generating electrical or optical signals depending on the nature of the physical medium connected. PMD signals are sent to the medium dependent interface (MDI), which is the actual medium connected, including connectors, for the various media supported.

As noted, one of the ways of creating an energy efficient network is through efficient link utilization. In general, the lack of data transmission does not significantly reduce energy consumption of a PHY in most implementations. A 10 Gbit/s link, for example, will consume about the same amount of power whether a burst of data is transmitted during a file transfer, a constant stream of data is transmitted at lower bandwidth, or no data is transmitted during an idle period. If a 10 Gbit/s link can be turned off or slowed down (e.g., to a 1 Gbit/s link) during idle times, then power can be saved in the operation of the PHY.

In accordance with the present invention, control of the power consumption mode transition process can be effected outside of the PHY. In one embodiment, the control policy can be effected in the MAC, MAC control, MAC client, or higher layers such as the application layer.

Figure 2:
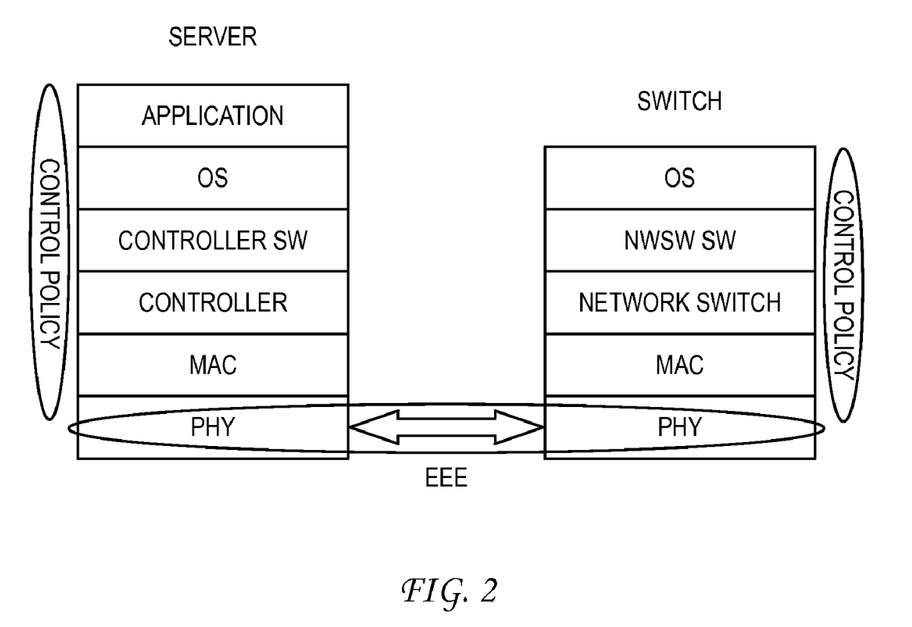
FIG. 2 illustrates an example of a coordinated end-to-end control policy.
Figure 3:
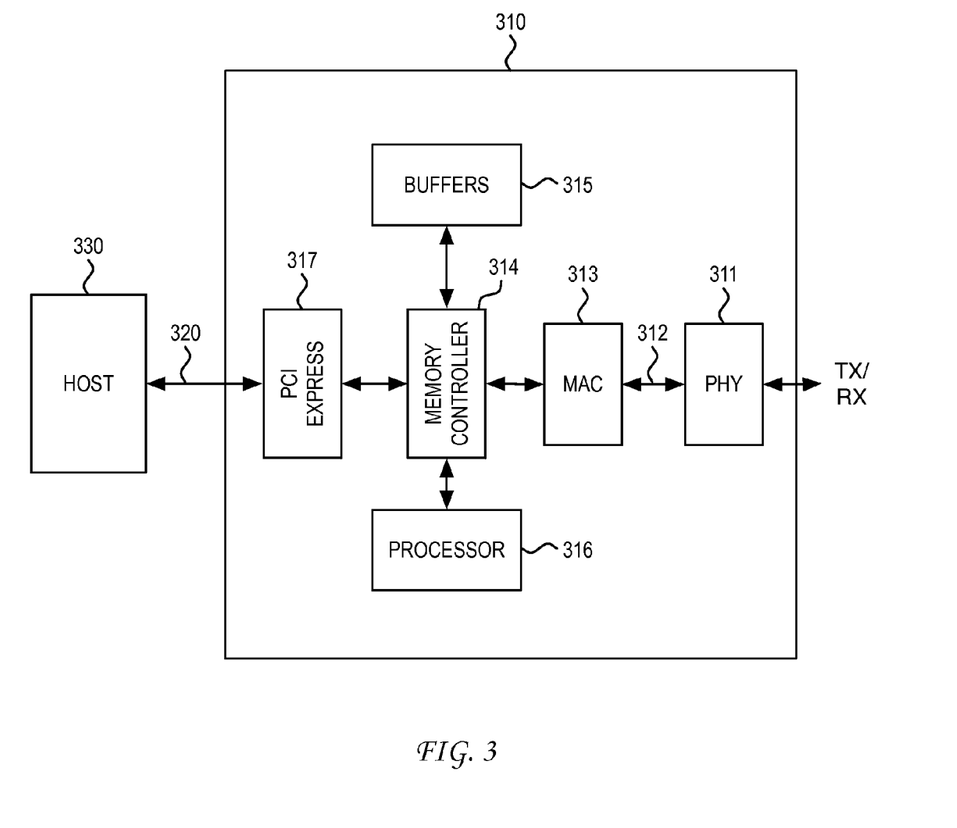
FIG. 3 illustrates an example of a controller.

FIG. 2 illustrates an example of a coordinated control policy that can be used to impact the operation of a PHY. In general, energy efficient Ethernet mechanisms can touch a number of devices and software throughout the stack and across the link. In the example illustration of a link between a server and a switch, energy savings are sought to be effected in the link between the PHYs in the server and the switch. The control policy that governs the operation of the link between the PHYs can be implemented in one or more layers above the PHY in the server and/or switch. As would be appreciated, the particular mechanism by which the control policy is effected would be implementation dependent. The key, however, is the linkage of the control policy to the EEE savings that can be produced in transitioning the operation of the PHYs. In one example, a coordinated control policy can include the exchange of load information by the two ends of the link ahead of time. FIG. 3 illustrates an example controller system in which the principles of the present invention can be implemented. In various examples, the controller can be part of a client (e.g., laptop, desktop or workstation), a server (e.g., audio-video (AV) server, high performance computing (HPC) server), or a consumer edge device (e.g., HDTV, Blu-eray, etc.). As illustrated, host system 330 is coupled to integrated Ethernet controller 310 via interface 320. Ethernet controller 310 further includes PHY 311, which is coupled to MAC 313, via interface 312 such as that described above with reference to FIG. 1. In the illustrated example, MAC 313 is coupled to PCI Express device 317 via memory controller 314, which is also coupled to buffers 315 and processor 316.

In this example system, host 330, processor 316, and/or MAC 313 can be designed to monitor one or more conditions to determine whether a transition in a power consumption mode should be made. In one example, the monitoring is of a buffer level relative to a watermark. In another example, the monitoring can be based on a rate of change of a traffic queue. In yet another example, the monitoring can be based on sub-system states (e.g., PCI Express going to sleep). In general, as this monitoring process effects an upper layer control, the analysis can focus on such things as pending work requests, tasks, protocols that provide more bandwidth intelligence (e.g., AV bridging), etc. As noted, effecting an upper layer control of the power consumption mode transitions removes significant limitations of PHY-based control methods and systems.

Figure 4:
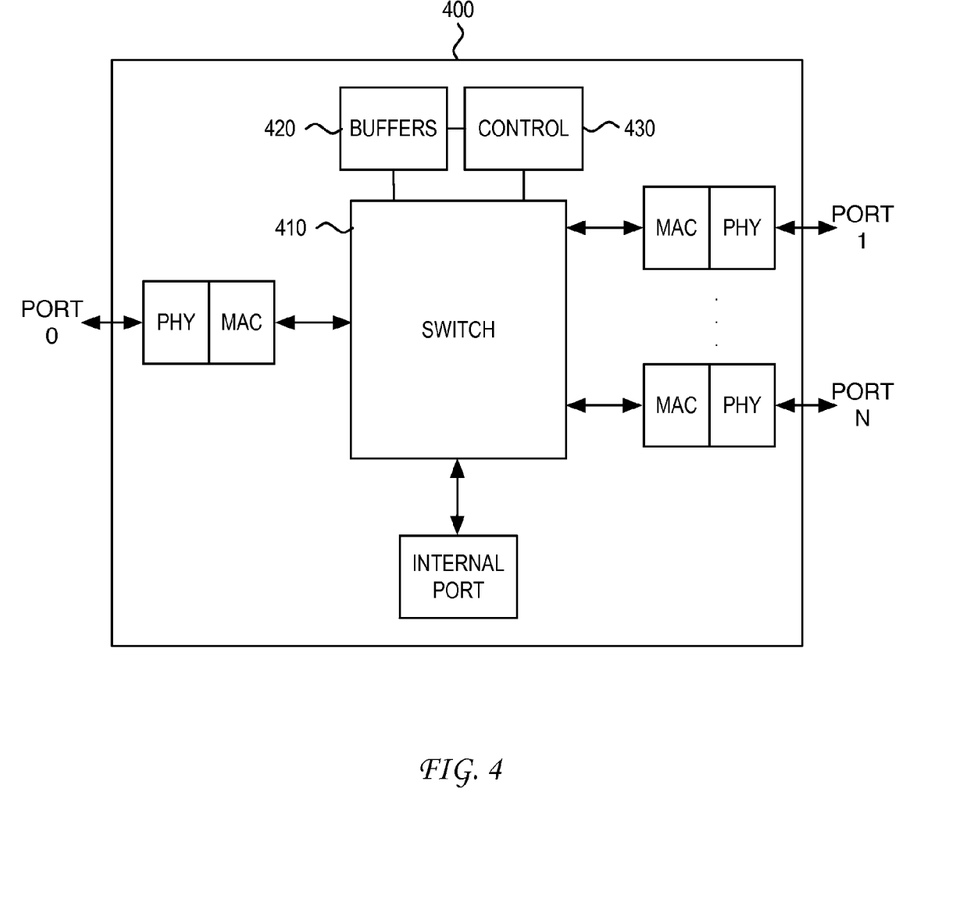
FIG. 4 illustrates an example of a switch.

FIG. 4 illustrates an example switching system in which the principles of the present invention can be implemented. In various examples, switching system 400 can represent a router or any other device that incorporates multi-port switch functionality. In various example, the switch can be a consumer, SMB, enterprise, metro, or access switch. In another example, switching system 400 can represent a voice over IP (VoIP) chip that has a network interface (Port 0) and a PC interface (Port 1). In yet another example, switching system 400 can represent a customer premise equipment (CPE) device in a service provider access network that can have an optical central office (CO) facing interface (Port 0) and multiple interfaces (Ports 1-N) that are facing the home and/or gateway (e.g., the CPE can simply be a media converter and/or part of the home gateway). Still further, switching system 400 can represent an access point such as a WLAN base station.

As illustrated, switching system 400 includes switch 410 that supports an internal port and a plurality of external ports 0-N via MAC and PHY interfaces. Switch 410 is also supported by buffers 420 and control 430.

In this example system, the operating system, the switch software, control 430, and/or and/or a MAC can be designed to monitor one or more conditions to determine whether a transition in a power consumption mode for a PHY should be made. Similar to above, the monitoring can relate to a buffer level relative to a watermark, a rate of change of a traffic queue, or any other upper layer control.

Figure 5:
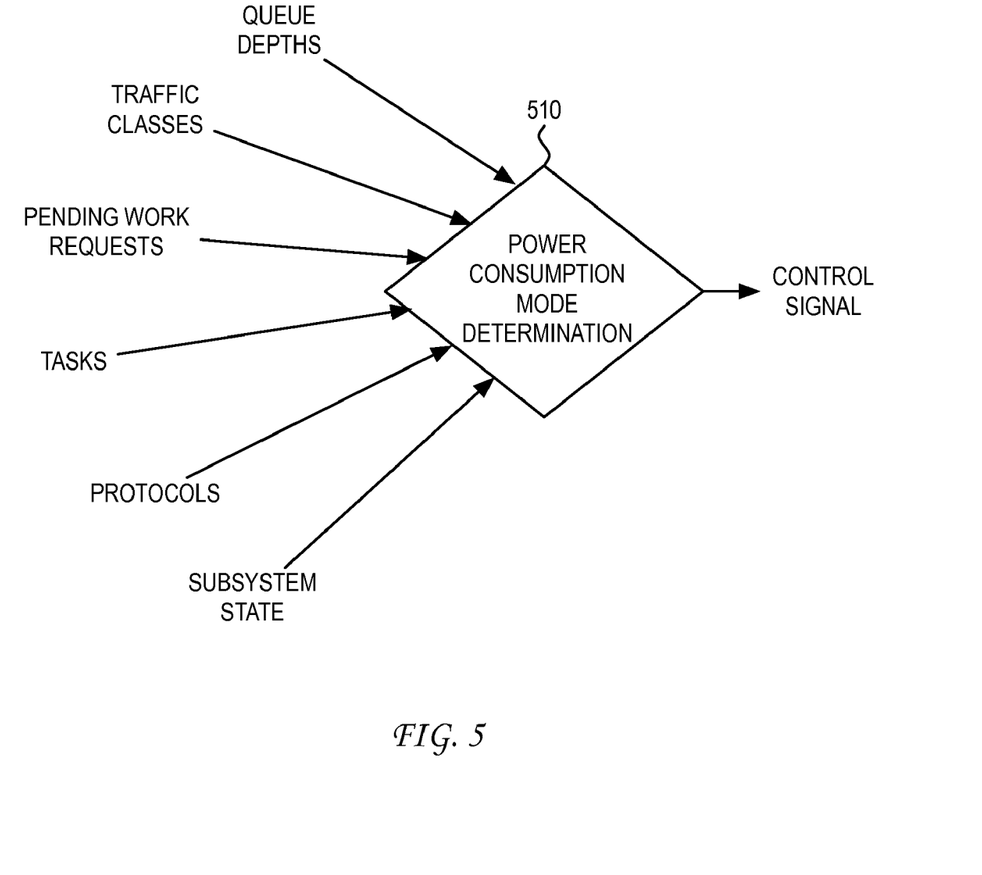
FIG. 5 illustrates an example of a power consumption mode determination.

FIG. 5 illustrates a generic mechanism by which a power consumption mode control signal can be generated. As illustrated, various upper layer monitored parameters (e.g., queue depths, traffic classes, pending work requests, etc.) can be used as inputs to power consumption mode determination 510. As would be appreciated, the principles of the present invention would not be dependent on the particular set of upper layer monitored parameters that are used as input. With a particular input set of upper layer monitored parameters, power consumption mode determination 510 can then produce a control signal for use by the PHY.

Figure 6:
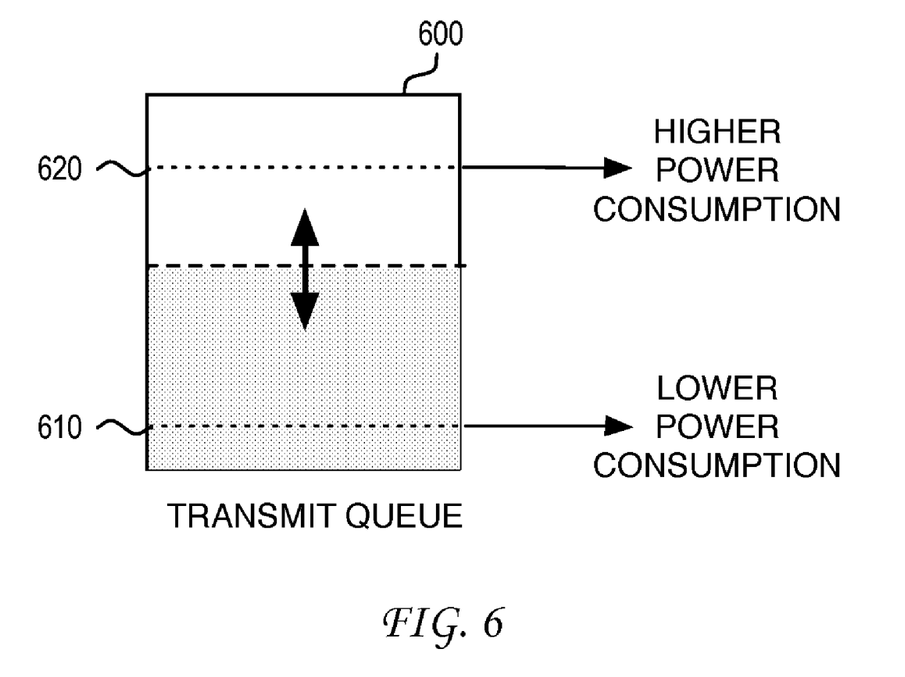
FIG. 6 illustrates an example of a power consumption mode determination using a transmit queue.

FIG. 6 illustrates a simple example of a control signal produced by examining a transmit queue depth. In this implementation, the depth of transmit queue 600 relative to two watermark levels can be used to generate a control signal for the PHY. As illustrated, the passage of the queue depth below watermark 610 would generate a control signal that signals to the PHY to enter into a lower power consumption mode having a lower link rate. This reduced power mode reflects the relative lack of necessity of transmission bandwidth. Conversely, the passage of the queue depth above watermark 620 would generate a control signal that signals to the PHY to enter into a higher power consumption mode having a higher link rate. This increased power mode reflects the relative necessity of increased transmission bandwidth.

In the example of FIG. 6, it should also be noted that the rate of change of the queue can be monitored. For example, a detection of a rapidly filling queue could generate a control signal for the PHY to enter a higher power consumption mode having a higher link rate, while a detection of a rapidly emptying queue could generate a control signal for the PHY to enter a lower power consumption mode having a lower link rate.

In another example, a controller can be designed that would receive multiple inputs, such as a transmission queue signal, a PCI state signal (e.g., L states), and a pending request signal. Here, an AND gate on all three input signals can be used to determine whether to enter into a lower power consumption mode, while an OR gate can be used to get out of the lower power consumption mode.

Regardless of the particular upper layer in which the control is effected, the power consumption mode control decision is communicated from a MAC to a PHY. It is a feature of the present invention that this control signal would provide the PHY with information that enables the PHY to perform a power consumption mode switch. In one embodiment, the control signal over the MAC/PHY interface can be used by to identify when to switch power consumption mode, and the particular power consumption mode to switch to. For example, the control signal can identify how much to slow down (e.g., shut down) or speed up the link rate of the PHY. In one embodiment, the control signal can also include information about the operation of the interface between the PHY and MAC (e.g., MAC/PHY interface itself going silent). In various examples, information regarding the parameters of how the MAC/PHY interface emerges from a silent or sleep state (e.g., time for the clock resync, etc.) can be communicated over the MAC/PHY interface, out of band, and/or programmed through a packet exchange/registers.

It should be noted that the decision to slow down (or shut down) need not happen in real time. This is in contrast to the decision to speed up, the delay of which can lead to buffering requirements that can become huge and unfeasible.

In the present invention, the control signal can be provided via the MAC/PHY interface using in-band signaling (e.g., extra bits present in an xMII interface), out-of-band signaling (e.g., external dedicated signaling, extra pins, etc.), or through a packet exchange and/or register accesses (e.g., register over MDIO and/or other methods). As would be appreciated, the particular mechanism used to effect such control signaling would be implementation dependent.

It should also be noted that the MAC/PHY interface can be designed to support power consumption mode change signaling from the PHY to the MAC. This form of reporting can be useful where symmetric switching is implemented such that a power consumption mode switch signaled by a far-end peer device would cause a corresponding switch in the link-rate transmission downstream to the far-end peer device. For asymmetric operation, the switching policy simply looks at one direction at a time (i.e., only the transmit path). Here, the far end side simply needs to ready itself for the change.

Figure 7:
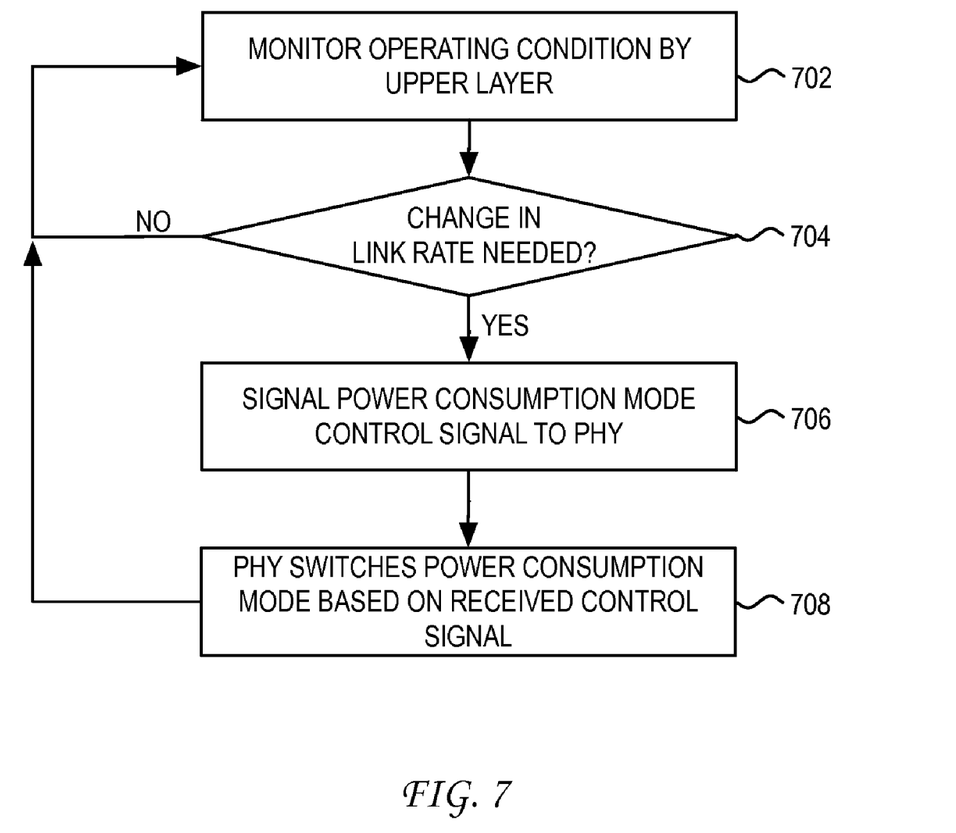
FIG. 7 illustrates a flowchart of a control process of the present invention.

To further illustrate the features of the present invention, reference is now made to the flowchart of FIG. 7. As illustrated, the process begins at step 702 where an upper layer monitors an operating condition. As noted, this operating condition can relate to a buffer, queue, subsystem state, work request, bandwidth allocation protocol, etc. Based on this monitoring, the upper layer can determine at step 704 whether a change in link rate is needed. If a change in link rate is not needed, then the process continues back to step 702 where the upper layer continues to monitor the system operating condition. If, on the other hand, the upper layer determines that a change in link rate is needed, then the process continues to step 706 where the control signal regarding a switch in power consumption mode is communicated to the PHY via the MAC/PHY interface (e.g., inband, out-of-band, etc.). In various embodiments, the control signal can be generated by the MAC, MAC control, MAC client, or higher layer (e.g., application layer). Upon receipt of the control signal by the PHY over the MAC/PHY interface, the PHY would then switch the power consumption mode at step 708. This switch of power consumption mode can be effected in various ways, such as through subset PHYs, low power idle modes, etc.

Figure 8:
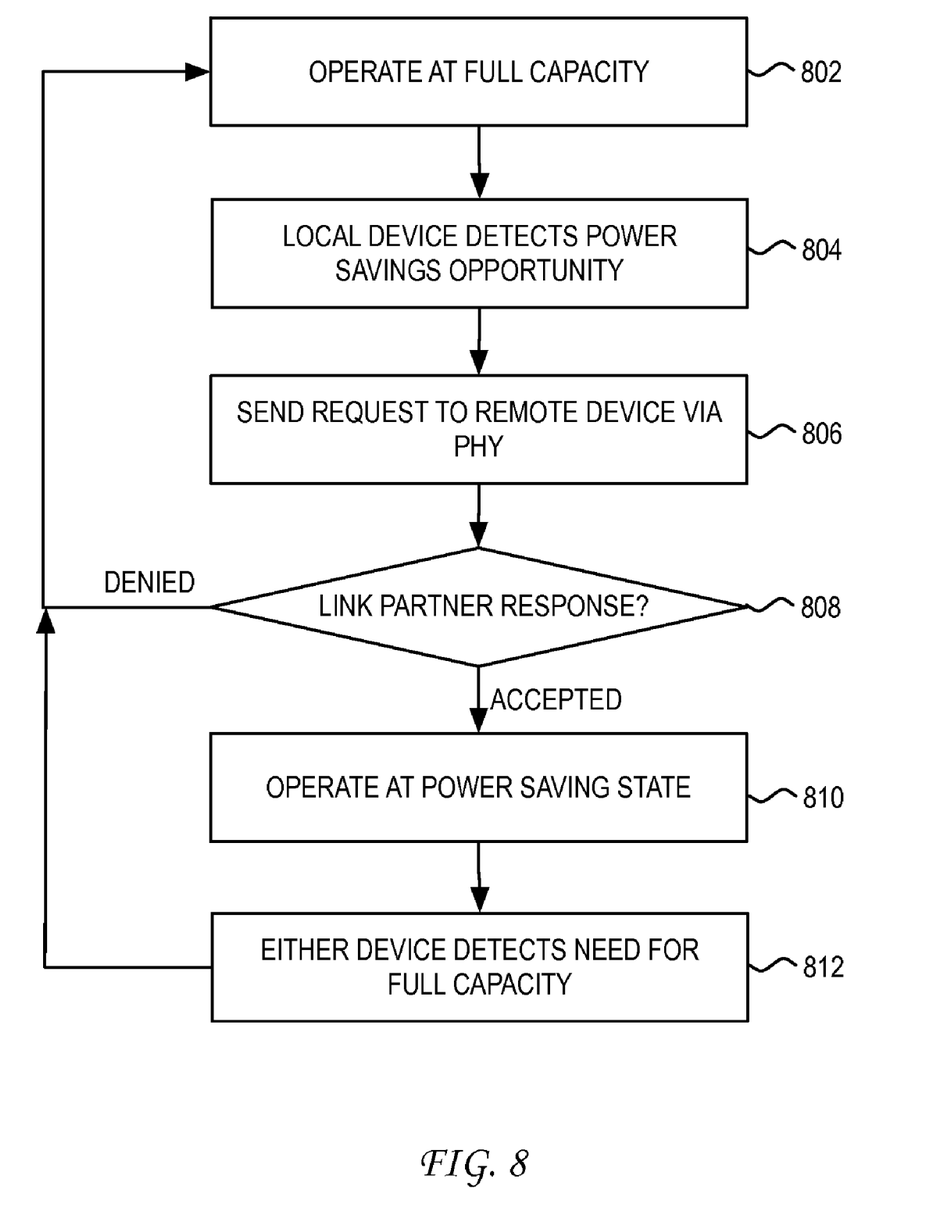
FIG. 8 illustrates a flowchart of a symmetric operation of the present invention.

The process of FIG. 7 illustrates an example of asymmetric operation where the switching policy simply looks at one direction at a time. For symmetric operation, the switching policy for both directions are related. FIG. 8 illustrates an example of symmetric operation.

As illustrated, the process begins at step 802 where the system is operating at full capacity. At step 804, a local device detects a power savings opportunity. Based on this detection, at step 806, the local device then sends a request to a remote device via the PHY to switch to a power savings state. At step 808, the link partner response to the transmitted request is determined. If it is determined at step 808 that the link partner has denied the request, then the system continues to operate at full capacity. If, on the other hand, it is determined at step 808 that the link partner has accepted the request, then the process continues to step 810 where the both ends of the system transition to operate in the power savings state. As noted above, this process would be facilitated by messaging through the MAC/PHY interface on both ends. After the system has transitioned to the power savings state, either device's control policy can then trigger the return to full capacity. This process is represented by the detection at step 812, which causes the process to return to full capacity operation at step 802.

As has been described, a coordinated end-to-end control policy such as that exemplified by FIG. 2 can be implemented such that power savings can be realized by the PHYs. Significantly, this coordinated end-to-end control policy can be implemented at one or more higher layers of both link partners.

Figure 9:
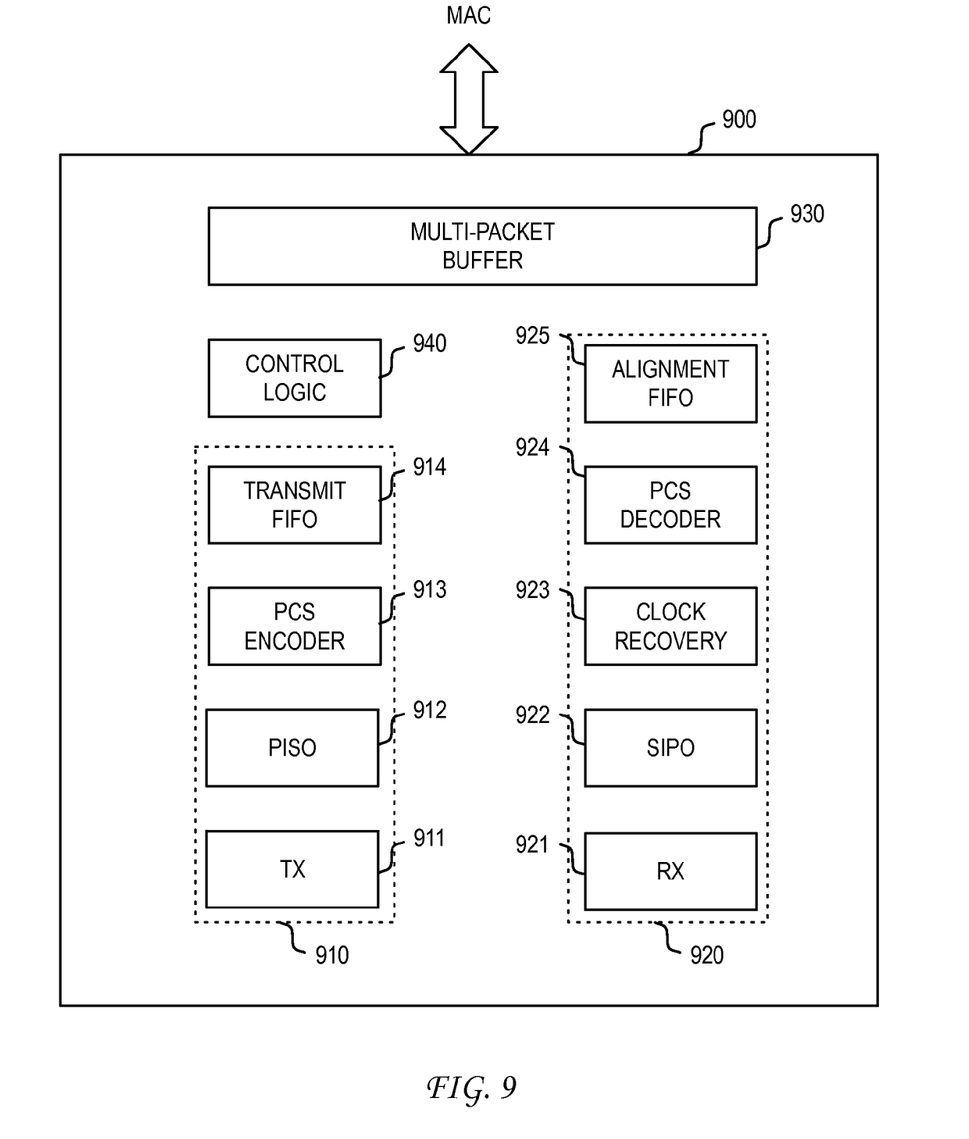
FIG. 9 illustrates an embodiment of a physical layer device having a multi-packet buffer.

In one embodiment, the PHY can be configured such that it can control switching between power consumption modes on its own. In this configuration, the PHY can control the switching based on an examination of multiple packets received from the MAC. FIG. 9 illustrates an embodiment of such functionality integrated into a PHY. As illustrated, PHY 900 includes transmitter section 910 and receiver section 920. Transmitter section 910 includes transmitter (TX) 911, parallel-in-serial-out (PISO) block 912, encoder 913, and transmit FIFO 914. In general, PISO 912 takes the TX code group output from PCS encoder 913 and generates a serial output for the PMD. The operation of PISO 912 is based on a clock signal generated by a clock multiplier unit (CMU), which multiplies the incoming parallel PMA TX clock. In one embodiment, PISO 912 has a single shift register that receives the parallel data once per parallel clock and shifts it out at the higher serial clock rate.

Receiver section 920 includes receiver (RX) 921, serial-in-parallel-out (SIPO) block 922, clock recovery 923, PCS decoder 924, and alignment FIFO 925. In general, SIPO 922 takes the serial input from the PMD and generates the RX code group for the PMA. The RX code group is processed by PCS decoder 924 in accordance with an embedded clock in the received signal. This recovered clock signal is generated by a clock recovery unit (CRU), which divides the incoming clock down to the parallel rate for output to the PCS.

As FIG. 9 further illustrates, PHY 900 also includes multi-packet buffer 930, which buffers packets in the interface with the MAC. In general multi-packet buffer 930 enables PHY 900 to perform its own control of switching between power consumption modes through an examination of multiple packets. In one embodiment, this control is effected by control logic 940, which can examine a relative fullness of multi-packet buffer 930. In one example, control logic 940 can be configured to monitor a fullness of multi-packet buffer 930 relative to a threshold, wherein a crossing of the threshold would produce a switch control signal.

It is a feature of the present invention that the inclusion of a multi-packet buffer in the PHY would enable a delay in the transmission of packets by the PHY. This can be useful, for example, where the PHY is in a process of transitioning from a lower functioning state (e.g., sleep or low link rate) to a higher functioning state. The inclusion of multi-packet buffer in the PHY would thereby enable a transmission delay until the PHY has effectively transitioned to the needed operating state.

Conventional PHYs do not implement any buffering and are therefore responsible for transmitting whatever information is received from the MAC. By inclusion of buffering in the PHY, the PHY can store, transition (e.g., based on an increasing or absolute/threshold fullness), and then transmit information without issue, even when the power consumption mode was initially lowered due to upper layer control. With the principles of the present invention, a PHY can maintain effective operation irrespective of who controlled the earlier transition of power consumption mode.

The inclusion of multi-packet buffering in the PHY would also enable the PHY to make fine-grained control decisions. For example, the PHY can determine whether the multi-packet buffer is empty or at a low threshold, then proceed to transition the PHY to a lower power consumption mode.

As would be appreciated, the principles of the present invention can be applied to any type of MAC/PHY interface (e.g., internal or external), and can use any form of signaling (e.g., in-band, out-of-band, etc.) in effecting power consumption mode changes in the PHY. As such, the principles of the present invention can be applied to various PHY types (e.g., backplane, twisted pair, optical, etc.) as well as standard or non-standard (e.g., 2.5G, 5G, etc.) link rates, as well as future link rates (e.g., 40G, 100G, etc.).

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered be exclusive of these other embodiments. Also, it is to be understood that the phraseology and terminology employed herein are for the purposes of description and should not be regarded as limiting.

What is claimed is:

1. An energy efficient Ethernet method, comprising:
   detecting a condition that is conducive to a change in a link rate of an Ethernet link;
   sending a message to a media access control layer that identifies a change to a link rate of said Ethernet link;
   changing a rate of operation of said media access control layer after receipt of said message;
   signaling, by said media access control layer to a physical layer device, an instruction to change said link rate of said physical layer device; and
   changing an operating state of said physical layer device upon receipt of said instruction.

2. The method of claim 1, wherein said detecting comprises monitoring a buffer or queue.

3. The method of claim 1, wherein said detecting comprises monitoring a subsystem state.

4. The method of claim 1, wherein said signaling is done in band.

5. The method of claim 1, wherein said signaling is done out of band.

6. The method of claim 1, wherein said changing an operating state comprises switching to a subset physical layer device.

7. The method of claim 1, wherein said changing an operating state comprises switching to a low power idle mode.

8. The method of claim 1, wherein said changing an operating state comprises switching from a subset physical layer device to a parent physical layer device.

9. The method of claim 1, wherein said changing an operating state comprises switching from a low power idle mode to an active mode.

10. The method of claim 1, wherein said changing a rate of operation of said media access control layer comprises changing a rate of operation of an interface with said physical layer device.

11. An energy efficient Ethernet method in a physical layer device, comprising:
    receiving a link utilization change message via an interface that couples the physical layer device to a media access control layer;
    switching from a first link rate to a second link rate in response to a receipt of said link utilization change message, wherein one of said first link rate and said second link rate is lower than the other link rate; and
    switching a part of said media access control layer that supports said interface from a first rate to a second rate in response to a condition that produces said link utilization change message.

12. The method of claim 11, wherein said receiving comprises receiving via in band signaling on said interface.

13. The method of claim 11, wherein said receiving comprises receiving via out of band signaling on said interface.

14. An energy efficient Ethernet method, comprising:
    detecting, using components in a layer above a media access control layer, a condition that is conducive to a change in a link rate of an Ethernet link;
    sending, in response to said detection, a message to said media access control layer that indicates a change a link rate of said Ethernet link;

signaling, by said media access control layer to a physical layer device, an instruction to change said link rate of said physical layer device;

changing, in response to said message, an operating state of a part of said media access control layer that supports an interface between said media access control layer and said physical layer device; and changing an operating state of said physical layer device upon receipt of said instruction from said media access control layer.

15. The method of claim 14, wherein said detecting comprises monitoring a subsystem status.

16. The method of claim 14, wherein said detecting comprises monitoring in an application layer.

17. The method of claim 14, wherein said detecting comprises monitoring a bandwidth allocation protocol.

18. The method of claim 14, wherein said changing an operating state of said physical layer device comprises changing to a subset mode of operation.

19. The method of claim 14, wherein said changing an operating state of said physical layer device comprises changing to a low power idle mode of operation.

20. The method of claim 14, wherein said signaling comprises signaling using in band communication on said interface.

21. The method of claim 14, wherein said signaling comprises signaling using out of band communication on said interface.

* * * * *